United States Patent
Alexander et al.

(10) Patent No.: US 9,886,327 B2
(45) Date of Patent: *Feb. 6, 2018

(54) RESOURCE MAPPING IN MULTI-THREADED CENTRAL PROCESSOR UNITS

(71) Applicant: International Business Machines Corporation, Armonk, NY (US)

(72) Inventors: Khary J. Alexander, Poughkeepsie, NY (US); Markus Helms, Boeblingen (DE); Christian Jacobi, Poughkeepsie, NY (US); Bernd Nerz, Boeblingen (DE); Volker Urban, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,469

(22) Filed: Nov. 30, 2015

(65) Prior Publication Data

US 2016/0117200 A1   Apr. 28, 2016

Related U.S. Application Data

(63) Continuation of application No. 14/520,505, filed on Oct. 22, 2014.

(51) Int. Cl.
*G06F 9/44* (2006.01)
*G06F 9/45* (2006.01)
(Continued)

(52) U.S. Cl.
CPC .............. *G06F 9/52* (2013.01); *G06F 9/5077* (2013.01); *G06F 8/10* (2013.01); *G06F 8/314* (2013.01); *G06F 8/45* (2013.01)

(58) Field of Classification Search
CPC ... G06F 8/10; G06F 8/45; G06F 8/314; G06F 8/456; G06F 9/5066
See application file for complete search history.

(56) References Cited

U.S. PATENT DOCUMENTS 6,092,175 A   7/2000 Levy et al.
6,718,533 B1 * 4/2004 Schneider ................ G06F 8/10
                                                                    700/97
(Continued)

FOREIGN PATENT DOCUMENTS

WO   2011147727 A1   12/2011

OTHER PUBLICATIONS

Weng et al., "Scheduling Optimization in Multicore Multithreaded Microprocessors through Dynamic Modeling", ACM, CF'13, May 2013, pp. 1-10; <http://dl.acm.org/citation.cfm?doid=2482767.2482774>.*

(Continued)

*Primary Examiner* — Thuy Dao
*Assistant Examiner* — Ben C Wang
(74) *Attorney, Agent, or Firm* — Isaac J. Gooshaw

(57) ABSTRACT

A processor determines that processing of a thread is suspended due to limited availability of a processing resource. The processor supports execution of the plurality of threads in parallel. The processor obtains a lock on a second processing resource that is substitutable as a resource during processing of the first thread. The second processing resource is included as part of a component that is external to the processor. The component supports a number of threads that is less than the plurality of threads. The processing of the thread is suspended until the lock is available. The processor processes the first thread using the second processing resource. The processor includes a shared register to support mapping a portion of the plurality of threads (Continued)

to the component. The portion of the plurality of threads is equal to, at most, the number of threads supported by component.

6 Claims, 6 Drawing Sheets

(51) Int. Cl.
*G06F 9/52* (2006.01)
*G06F 9/50* (2006.01)

(56) References Cited

U.S. PATENT DOCUMENTS

| | | | |
|---|---|---|---|
| 7,051,329 B1 | 5/2006 | Boggs et al. | |
| 7,290,261 B2 | 10/2007 | Burky et al. | |
| 7,856,636 B2 | 12/2010 | Bhatia et al. | |
| 8,055,856 B2 | 11/2011 | Coon et al. | |
| 8,966,491 B2* | 2/2015 | Calciu | 707/704 |
| 9,401,869 B1* | 7/2016 | Tang | H04L 47/70 |
| 9,760,511 B2* | 9/2017 | Bradbury | G06F 13/26 |
| 2004/0193854 A1 | 9/2004 | Cho | |
| 2007/0260667 A1* | 11/2007 | Duzak | G06F 9/5066 708/521 |
| 2007/0261053 A1 | 11/2007 | Avkarogullari et al. | |
| 2007/0294702 A1 | 12/2007 | Melvin et al. | |
| 2009/0089817 A1* | 4/2009 | Bybell | G06F 9/3851 719/328 |
| 2010/0191711 A1* | 7/2010 | Carey | G06F 9/52 707/704 |
| 2010/0333091 A1* | 12/2010 | Lin | G06F 8/314 718/100 |
| 2011/0066828 A1 | 3/2011 | Wolfe et al. | |
| 2011/0161616 A1 | 6/2011 | Tarjan et al. | |
| 2011/0296428 A1 | 12/2011 | Rawson, III et al. | |
| 2012/0036339 A1* | 2/2012 | Frazier | G06F 9/30101 712/220 |
| 2012/0072707 A1* | 3/2012 | Arndt | G06F 9/3004 712/234 |
| 2012/0180062 A1* | 7/2012 | Sohi | G06F 9/5066 718/104 |
| 2012/0254888 A1* | 10/2012 | Kalogeropulos | G06F 8/452 718/107 |
| 2012/0278323 A1* | 11/2012 | Chattopadhyay | G06F 17/30445 707/737 |
| 2012/0297163 A1* | 11/2012 | Breternitz | G06F 9/5066 712/22 |
| 2013/0268911 A1* | 10/2013 | Charfi | G06F 8/10 717/105 |
| 2013/0332711 A1* | 12/2013 | Leidel | G06F 9/30145 712/227 |
| 2014/0007041 A1* | 1/2014 | Schmeling | G06F 8/10 717/105 |
| 2014/0282600 A1* | 9/2014 | Siepmann | G06F 9/44 718/106 |
| 2014/0337848 A1* | 11/2014 | Llamas | G06F 9/52 718/102 |
| 2014/0359632 A1 | 12/2014 | Kishan et al. | |
| 2015/0082317 A1* | 3/2015 | You | G06F 9/5094 718/104 |
| 2015/0170318 A1* | 6/2015 | Gould | G06F 9/5066 345/505 |
| 2015/0277908 A1* | 10/2015 | Bradbury | G06F 9/3009 718/1 |
| 2015/0277918 A1* | 10/2015 | Bradbury | G06F 9/3851 712/215 |
| 2015/0317157 A1* | 11/2015 | Gruber | G06F 9/3009 712/22 |
| 2015/0324206 A1* | 11/2015 | Eisen | G06F 9/38 712/215 |
| 2016/0048416 A1* | 2/2016 | Nakashima | G06F 9/5066 718/102 |
| 2016/0092280 A1* | 3/2016 | Al | G06F 9/52 718/106 |
| 2016/0103682 A1* | 4/2016 | Alexander | G06F 9/3834 711/125 |
| 2016/0103774 A1* | 4/2016 | Bradbury | G06F 9/45558 710/33 |
| 2016/0117169 A1* | 4/2016 | Biran | G06F 9/30021 712/228 |
| 2016/0117170 A1* | 4/2016 | Biran | G06F 9/30021 712/229 |
| 2016/0117191 A1* | 4/2016 | Alexander | G06F 9/4881 718/108 |
| 2016/0117192 A1* | 4/2016 | Alexander | G06F 9/4881 718/107 |
| 2016/0117193 A1* | 4/2016 | Alexander | G06F 9/5077 718/104 |
| 2016/0170768 A1* | 6/2016 | Alexander | G06F 9/5005 712/244 |
| 2016/0179574 A1* | 6/2016 | Merrill, III | G06F 7/523 718/106 |

OTHER PUBLICATIONS

Inoue et al., "Performance of Multi-Process and Multi-Thread Processing on Multi-core SMT Processors", IEEE, IISWC'10, Dec. 2010, pp. 1-10; <http://ieeexplore.ieee.org/stamp/stamp.jsp?arnumber=5650174>.*

András Vajda, "Chapter 2—Programming Many-Core Chips", Jun. 2011 Springer, pp. 9-43; <http://www.springer.com/us/book/9781441997388>.*

James R. Bulpin, "Operating system support for simultaneous multithreaded processors", Technical Report, No. 619, University of Cambridge Feb. 2005, pp. 1-130; <https://www.cl.cam.ac.uk/techreports/UCAM-CL-TR-619.pdf>.*

Watson et al., "Hardware Threading Techniques for Multi-Threaded MPSoCs", ACM, MES'14, Jun. 2014, pp. 1-4; <http://dl.acm.org/citation.cfm?id=2613917&CFID=809256710&CFTOKEN=60555220>.*

Radojkovio et al., "Thread Assignment in Multicore/Multithreaded Processors: A Statistical Approach", IEEE, vol. 65, No. 1, Jan. 2016, pp. 256-269 <http://ieeexplore.ieee.org/stamp/stamp.jsp?tp=&arnumber=7070708>.*

Cazorla et al., "Dynamically Controlled Resource Allocation in SMT Processors", Proceedings of the 37th International Symposium on Microarchitecture, 1072-4451/04, © 2004 IEEE.

Raasch et al., "The Impact of Resource Partitioning on SMT Processors", Proceedings of the 12th International Conference on Parallel Architectures and Compilation Techniques (PACT'03), 1089-795X/03, © 2003 IEEE.

U.S. Appl. No. 14/520,505, entitled "Resource Mapping in Multi-Threaded Central Processor Units", filed Oct. 22, 2014.

IBM Appendix P, list of IBM patents or patent applications treated as related, pp. 1-2.

* cited by examiner

RESOURCE MAPPING IN MULTI-THREADED CENTRAL PROCESSOR UNITS

BACKGROUND OF THE INVENTION

The present invention relates generally to the field of computer thread processing, and more particularly to thread processing by multi-threaded central processing units.

Multiple-threaded central processing units (CPUs) have hardware support to execute multiple threads concurrently. Multiple-threaded CPUs are distinguished from multi-processing systems (such as multiple-core systems) in that the threads of a multiple-threaded CPU have to share the resources of a single core, such as the computing units, the CPU caches and the translation look-aside buffer (TLB), etc. In contrast, multiple-processing systems include multiple complete processing units with their own respective sets of resources, each of which processes a thread. Where multiple-processing systems include multiple complete processing units, multiple-threading aims to increase utilization of a single core by using thread-level as well as instruction-level parallelism. As the two techniques are complementary, they are often combined in systems with two or more multiple-threading CPUs and in CPUs with two or more multiple-threading cores.

SUMMARY

Embodiments of the present invention provide a method, system, and program product for a processor to support multiple execution of threads in parallel. A processor determines that processing of a first thread of a plurality of threads is suspended due to limited availability of a first processing resource. The processor supports execution of the plurality of threads in parallel. The processor obtains a first lock on a second processing resource that is substitutable for the first processing resource during processing of the first thread. The second processing resource is included as part of a component that is external to the processor. The component supports a number of threads that is less than the plurality of threads. The processing of the first thread is halted until the first lock is available. The processor processes the first thread using the second processing resource. The processor includes a shared register to support mapping of a portion of the plurality of threads to the component. The portion of the plurality of threads is equal to, at most, the number of threads that are supported by component.

DETAILED DESCRIPTION

While known solutions to utilize coprocessors and other like subcomponents are known for use by multithreaded central processing units, they include hardware and logic resources for each thread. Embodiments of the present invention recognize that the dedication of hardware and logic resources for use by each individual thread requires a large chip area. Embodiments of the present invention recognize that chip area is a valued resource during chip design. As such, embodiments of the present invention recognize that efficient usage of chip area is highly sought after. Embodiments of the present invention provide reduced hardware and logic resources to process threads using external components (such as subcomponents) that are statistically unlikely to be needed for the processing of all the threads that are concurrently being processed by a given multithreaded central processing unit at a given time. Some embodiments recognize matching the number of threads that are likely to need a given component to the amount of hardware and logic resources that are made available for the mapping of those threads to the component. Some embodiments recognize using components that support a number of threads equal to the number of threads that are statistically likely to need the resources of that component at a given time.

The present invention will now be described in detail with reference to the Figures.

Figure 1:
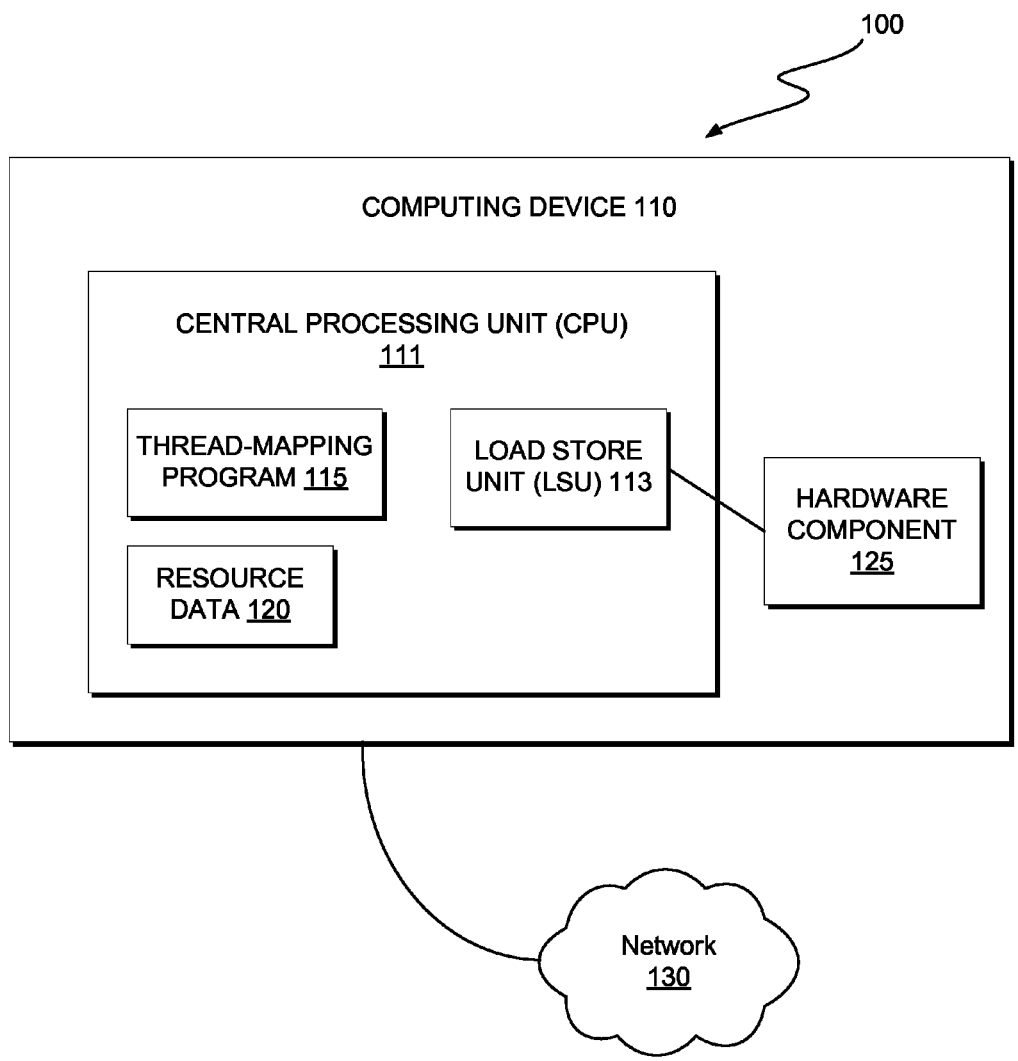
FIG. 1 is a functional block diagram illustrating a computer-instruction processing environment, in accordance with an exemplary embodiment of the present invention.

FIG. 1 is a functional block diagram illustrating a computer instruction processing environment, generally designated 100, in accordance with one embodiment of the present invention. Computer instruction processing environment 100 includes computing device 110 connected to network 130. Computing device 110 includes central processing unit 111 (which further includes load store unit (LSU) 113, thread-mapping program 115, and resource data 120) and hardware component 125. Note that central processing unit 111 is depicted as being connected to hardware component 125 via LSU 113. In general, LSU 113 manages the load and store operations of CPU 111. In general, resource data 120 is a data file that includes information about hardware component 125. For example, the processing limitations of hardware component 125, etc. In certain embodiments described herein, central processing unit 111 utilizes the resources of hardware component 125 (via LSU 113, thread-mapping program 115, and resource data 120) to process sequences of programmed instructions (i.e., threads). In this embodiment, hardware component 125 is a hardware component that is external to CPU 111, but is still accessible by CPU 111.

In general, in the case that CPU 111 does not have enough of a particular computing resource to process a particular thread, hardware component 125 includes a computing resource that can be substituted for that computing resource of CPU 111. For example, thread B requires resource B. CPU 111 has resource B but all of resource B is currently being utilized to process thread A. However, hardware component 125 includes resource C, which is of the same type as resource B, and therefore can be substituted for resource B during the processing of thread B. As such, thread-mapping program 115 causes thread B to be processed using resource C. In some cases, CPU 111 does not include the resource needed to process a thread at all. In such cases, a substitutable resource simply is the resource (both type and quantity thereof) that would allow CPU 111 to process the thread, but is unavailable to CPU 111 for the processing of the thread.

In various embodiments of the present invention, computing device 110 is a computing device that is one of a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 is any computing device or a combination of devices that include central processing unit 111, LSU 113, thread-mapping program 115, resource data 120, and hardware component 125, and is capable of executing thread-mapping program 115. In one embodiment, computing device 110 includes internal and external hardware components, as depicted and described in further detail with respect to FIG. 6.

In this exemplary embodiment, thread-mapping program 115 and resource data 120 are stored on computing device 110. However, in other embodiments, thread-mapping program 115 and resource data 120 may be stored, at least in part, externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, hardware component 125, thread-mapping program 115, and resource data 120, in accordance with a desired embodiment of the present invention.

In an embodiment, the goal of multiple-threading hardware support is, in general, to allow quick switching between a blocked thread and another thread that is ready to process. To achieve this goal, the hardware cost is to replicate the program visible registers as well as some processor control registers (such as the program counter). Switching from one thread to another thread means the hardware switches from using one register set to another. However, in some cases, there are insufficient resources on a multiple-threaded central processing unit (CPU), such as central processing unit 111, to process a given thread at a given time. For example, a first thread is utilizing all of resource A, which is included as part of the multiple-threaded CPU. As such, thread B has to wait for resource A to become available in order to be processed since thread B also requires the use of resource A to be processed.

In one embodiment, thread-mapping program 115 identifies whether there are sufficient resources available in central processing unit 111 to process a given thread. If there are insufficient resources available, then thread-mapping program 115 identifies an external (sometimes off-chip) component, such as hardware component 125, which has the resources needed to process the thread. Thread-mapping program 115 locks those resources and maps the thread to the component such that the component processes the thread and returns the result to central processing unit 111.

In general, such a processing of a given thread follows the following processing pattern: 1) write a lock command for the resource; 2) determine if the lock was obtained; 3) if no lock was obtained, then return to 1); 4) if the lock was obtained, then write to control registers; 5) copy source information for the thread from a memory (such as an input buffer); 6) read/poll the status register and determine whether the component engines have finished processing the thread; 7) if they have not finished processing the thread, then return to 6); if they have finished processing the thread, then read/poll the status register and determine whether data store processes are complete; 8) if the data store processes are not complete, then return to 7); and 9) if the data store processes are complete, then write an un-lock command for the resource.

A multiple-threaded computing system, such as computing device 110, includes a multiple-threaded CPU that is configured to minimize the resources (which take up chip area) that are delegated for use for the processing of threads that require the use of certain resources. These resources are statistically unlikely to be used by all of the threads supported by the multiple-threaded CPU at any given time. By using only what hardware is required under most circumstances, a more efficient and effective usage of chip area is achieved.

For example, in computing device 110, a component attached to a multiple-threaded CPU supports two threads. It is statistically known that, on average, the resources provided by that component are used five percent of the time by any given thread. The multiple-threaded CPU supports four threads. Instead of each thread having respective registers and hardware to utilize resources of the component, the multiple-threaded CPU includes a central (shared or common) register for mapping two of those threads to the component. In one embodiment, if the resources of the multiple-threaded CPU are unavailable or insufficient to process a thread (as determined by thread-mapping program 115), then thread-mapping program 115 maps that thread to the component for processing. For example, thread-mapping program 115 determines that the multiple-threaded CPU includes a resource that is configured to handle one thread, i.e., the resource is configured to process only one thread at a time. As such, if thread-mapping program 115 determines that a thread is already utilizing the resource, then thread-mapping program 115 maps other threads that call for that type of resource to a component that has that type of resource. In certain embodiments, no determination is made by thread-mapping program 115 as to whether the called for type of resource is included as part of the multiple-threaded CPU. In such embodiment, thread-mapping program 115 simply maps threads to one or more components if the thread calls for a type of resource that is included as part of that component.

In another embodiment, thread-mapping program 115 actively assesses the average usage of a given resource by the threads that are processed by the multiple-threaded CPU. In such embodiments, thread-mapping program 115 programmatically configures the number (and/or type) of hardware resources that are available such that the usage of on-chip hardware (e.g., logic and registers) is further optimized or improved. For example, in one embodiment, thread-mapping program 115 assesses the average usage of a given resource. Thread-mapping program 115 determines that on average, two threads need to use the resources of a component (in this case a field-programmable gate array (FPGA)). Based on the results of the assessment, to maximize the usage of those resources by the threads of a multiple-threaded CPU, thread-mapping program 115 uses an atomic update to block an input buffer of the FGPA and maps the input for that buffer to threads if those threads require the use of the resource. As such, thread-mapping program 115 increases the number of threads that utilize that resource.

Figure 2:
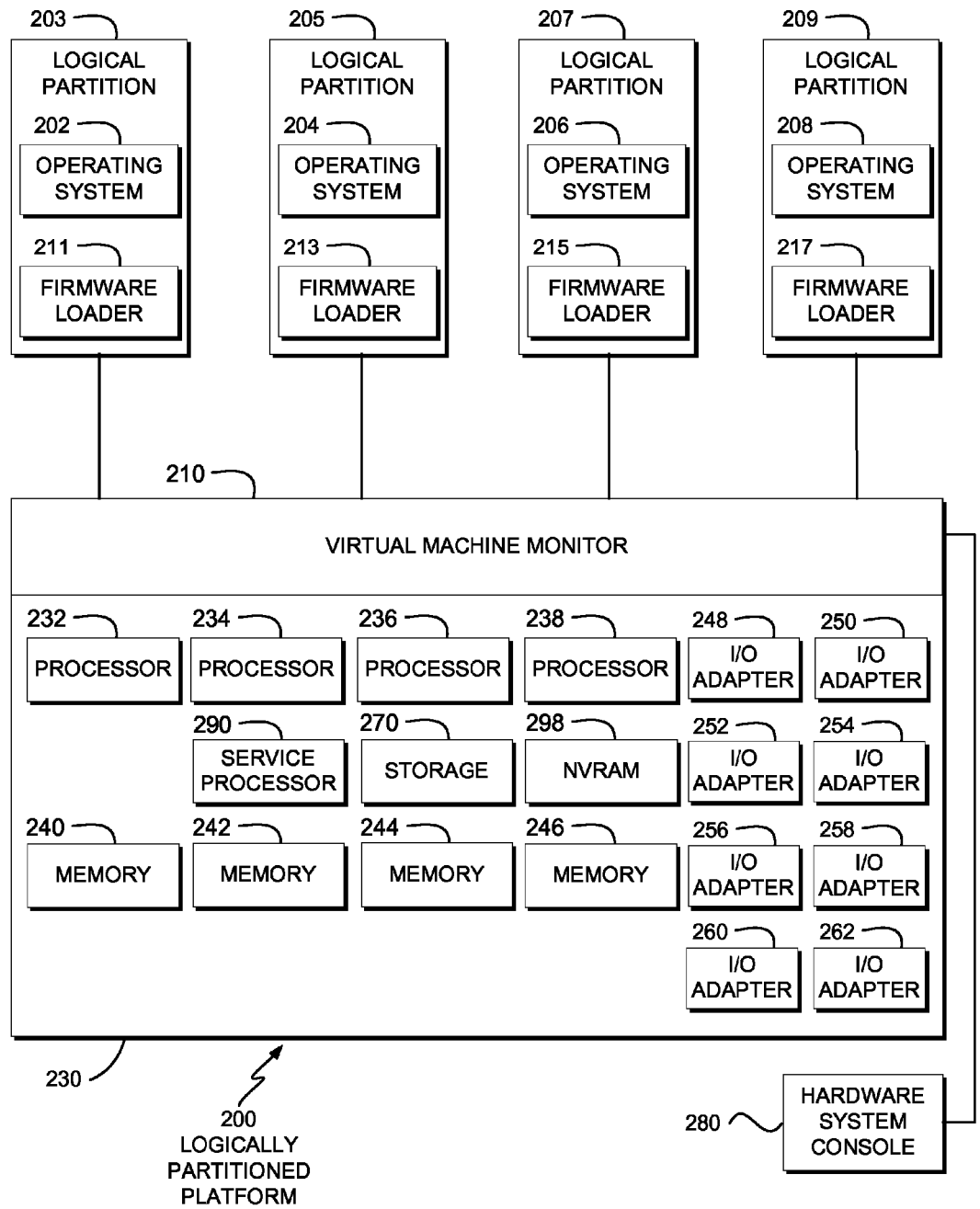
FIG. 2 depicts a block diagram of an exemplary logically partitioned platform in which the illustrative embodiments may be implemented.

FIG. 2 depicts a block diagram of an exemplary logically partitioned platform, 200, in which the illustrative embodiments may be implemented. The hardware in logically partitioned platform 200 may be implemented, for example, using the hardware of computing device 110 of FIG. 1.

Logically partitioned platform 200 includes partitioned hardware 230, operating systems 202, 204, 206, 208, and virtual machine monitor 210. Operating systems 202, 204, 206, and 208 may be multiple copies of a single operating system or multiple heterogeneous operating systems simultaneously run on logically partitioned platform 200. These operating systems may be implemented, for example, using an operating system that is designed to interface with a virtualization mechanism, such as partition management firmware, e.g., a hypervisor. Of course, other types of operating systems may be used depending on the particular implementation. Operating systems 202, 204, 206, and 208 are located in logical partitions 203, 205, 207, and 209, respectively.

Hypervisor software is an example of software that may be used to implement platform (in this example, virtual machine monitor 210). Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

Logically partitioned platform 200 may also make use of advanced memory virtualization technology that provides system memory virtualization capabilities that allow multiple logical partitions to share a common pool of physical memory. The physical memory of logically partitioned platform 200 may be assigned to multiple logical partitions either in a dedicated or shared mode. A system administrator has the capability to assign some physical memory to a logical partition and some physical memory to a pool that is shared by other logical partitions. A single partition may have either dedicated or shared memory. Active Memory Sharing may be exploited to increase memory utilization on the system either by decreasing the system memory requirement or by allowing the creation of additional logical partitions on an existing system.

Logical partitions 203, 205, 207, and 209 also include partition firmware loaders 211, 213, 215, and 217. Partition firmware loaders 211, 213, 215, and 217 may each be implemented using, for example, IPL or initial boot strap code, and runtime abstraction software (RTAS).

When logical partitions 203, 205, 207, and 209 are instantiated, a copy of the boot strap code is loaded into logical partitions 203, 205, 207, and 209 by virtual machine monitor 210. Thereafter, control is transferred to the boot strap code with the boot strap code then loading the open firmware and RTAS. The processors associated or assigned to logical partitions 203, 205, 207, and 209 are then dispatched to the logical partition's memory to execute the logical partition firmware.

Partitioned hardware 230 includes a plurality of processors 232-238, a plurality of system memory units 240-246, a plurality of input/output (I/O) adapters 248-262, and storage unit 270, service processor 290, and NVRAM 298. In various embodiments, processors 232-238 may each be, for example, microprocessors, network processors, etc. Each of processors 232-238, memory units 240-246, NVRAM storage 298, and I/O adapters 248-262 may be assigned to one of multiple logical partitions 203, 205, 207, and 209 within logically partitioned platform 200, each of which corresponds to one of operating systems 202, 204, 206, and 208.

Virtual machine monitor 210 performs a number of functions and services for logical partitions 203, 205, 207, and 209 to generate and enforce the partitioning of logically partitioned platform 200. Virtual machine monitor 210 is a firmware implemented virtual machine identical to the underlying hardware. Thus, virtual machine monitor 210 allows the simultaneous execution of independent OS images 202, 204, 206, and 208 by virtualizing all the hardware resources of logically partitioned platform 200.

Service processor 290 may be used to provide various services, such as processing of platform errors in logical partitions 203, 205, 207, and 209. Service processor 290 may also act as a service agent to report errors back to a vendor, such as International Business Machines Corporation. Operations of the different logical partitions may be controlled through a hardware system console 280. Hardware system console 280 is a separate data processing system from which a system administrator may perform various functions including reallocation of resources to different logical partitions.

The illustrative embodiments provide for a device driver to monitor dynamic reconfiguration kernel services of an operating system (OS). In response to a dynamic CPU reconfiguration, the device driver determines whether a CPU has been added or removed from the environment. If the dynamic CPU reconfiguration adds a CPU, the device driver dynamically allocates a queue pair (QP) (i.e., a transmit/receive pair). If the dynamic CPU reconfiguration removes a CPU, the kernel thread quiesces a QP and removes the QP. As used herein, a quiesce is a halt or interrupt of an operation of a processor. In an embodiment, the kernel thread quiesces a QP by waiting until the workload of the QP completes.

Figure 3:
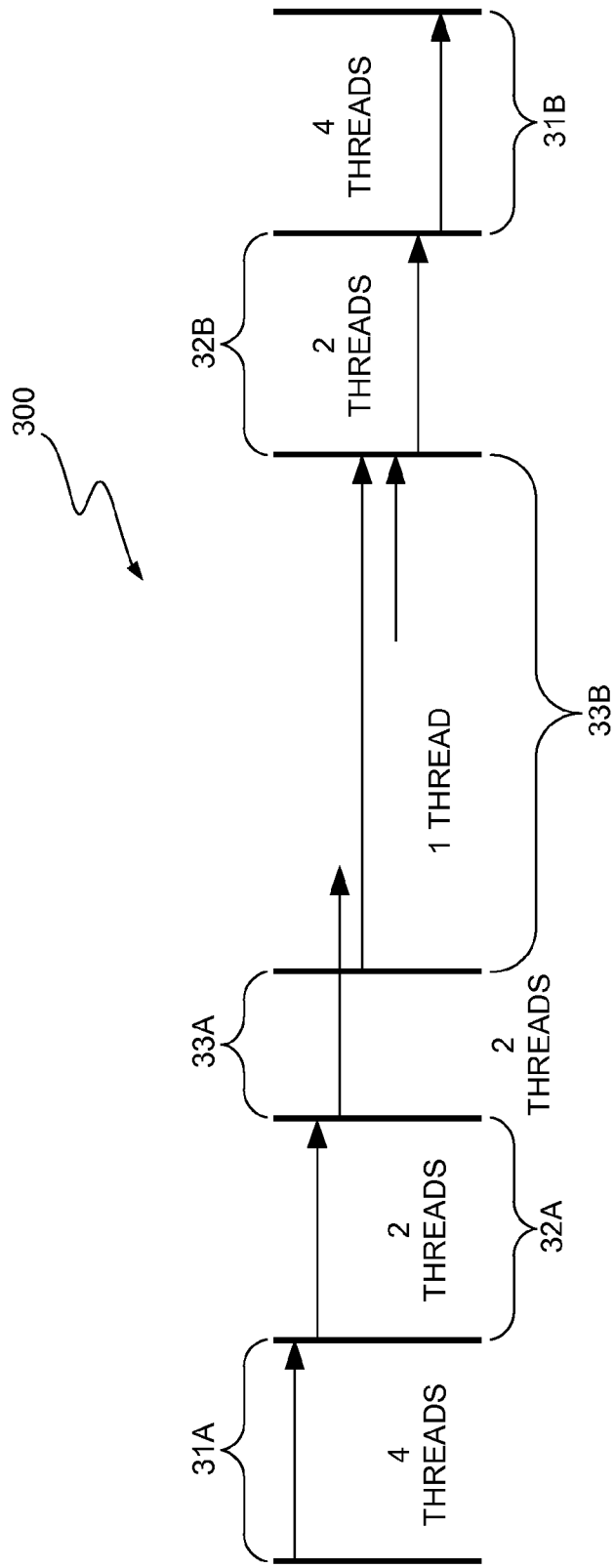
FIG. 3 illustrates a workflow diagram, 300, showing the phases for multithread processing as implemented by a hardware component of FIG. 1, in accordance with one embodiment of the present invention.

FIG. 3 illustrates a workflow diagram, 300, showing the phases for multithread processing as implemented by hardware component 125 of FIG. 1, in accordance with one embodiment of the present invention.

In FIG. 3, in one embodiment, thread-mapping program 115 utilizes millicode to process threads using the resources of a component (e.g., a co-processor). In this embodiment, there are three types of phases for this process namely: millicode only phases, millicode and component-hardware interactions, and hardware-engine phases. FIG. 3 includes arrows that indicate the starting point and ending point for various processes of each phase. In addition, the number of threads supported during a given phase is indicated.

In general, millicode is a higher level of microcode that is often used to implement the instruction set of a computer. Millicode runs on top of the micro-coded instructions and uses those instructions to implement more complex instructions that are visible to the user of that system. Microcode is a layer of hardware-level instructions or data structures involved in the implementation of higher level machine code instructions in central processing units, and in the implementation of the internal logic of many channel controllers, disk controllers, network interface controllers, network processors, graphics processing units, and other hardware. Microcode resides in special high-speed memory and translates machine instructions into sequences of detailed circuit-level operations. Microcode helps separate the machine instructions from the underlying electronics such that instructions are, in some cases, designed and altered more freely. Microcode also makes it feasible to build complex multi-step instructions while still reducing the complexity of the electronic circuitry compared to other methods. Writing microcode is often called micro-programming and the microcode in a particular processor implementation is sometimes called a micro-program.

As shown in FIG. 3, both phases 31A and 31B support four threads. In one embodiment, during millicode only phases, shown as phase 31A and phase 31B in FIG. 3, the component-hardware is not used. Instead, the computing system uses millicode to perform one or more functions such as: preparing, pre-checking, and initializing to prepare for the processing of the thread commands (phase 31A), and conducting post-processing of the results of the processed thread (phase 31B). For example, millicode pre-checks accessibility of storage operands in phase 31A, and updates general-purpose registers (GPRs) of the instruction and sets ending condition code in phase 31B. In certain embodiments, the hardware of the component is unaware of millicode. As such, in some embodiments, millicode often converts status-indicating signals received from the component to different status-indicating signals, which, in some cases, changes the indication represented by the signal. For example, millicode receives a "good status, done" or "not enough space" status-indicating signal from the component after the thread has been processed. The millicode converts that signal to an architected condition code of the instruction.

As shown in FIG. 3, both phases 32A and 32B support two threads. In one embodiment, during millicode and component-hardware interactions phases, shown as phase 32A and phase 32B in FIG. 3, the hardware resources of the component (e.g. address registers, control registers, status registers) are utilized by millicode. For example, before the thread is processed by the component, millicode initializes the component in phase 32A. In another example, as the thread is processed by the component, millicode commands the hardware of the component to extract information from the state registers of the component in phase 32B. In many cases, the regular component registers (for addresses, length, status, etc.) are virtualized such that they appear to millicode as thread specific, but the hardware (such as hardware from a request/response logic unit (RU), component, and load store unit (LSU)), use the thread-ID to obtain mapping info that is needed to select the correct set of resources of the component. The LSU manages all load and store operations. The load-store pipeline decouples loads and stores from the MAC and ALU pipelines. When the processor issues load multiple (LDM) and store multiple (STM) instructions to the load-store pipeline, other instructions run concurrently, subject to the requirements of supporting precise exceptions.

In one embodiment, during hardware-engine phases, shown as phase 33A and phase 33B in FIG. 3, millicode feeds instructions to an input buffer of the component. This phase is the main utilization phase, where specialized component engines are processing the input data and commands of the thread that is mapped to the component. In this process, millicode source operand (SRC) data is copied and written to input buffer. In addition, a hardware engine, included as part of the component, processes instructions to prepare data to be stored as a result. For example, compression call instructions (CMPSC), cryptographic conversions and Unicode® (UTF) conversions are executed on the results before the hardware stores the results.

In this embodiment, a design point for multi-thread processing by a component is based on one or more of the following attributes:
Startup/Ending-Overhead:
For instructions calls with relatively short block size (e.g. CMPSC call for 80 byte records) a large portion of the latency is spent in the millicode-only-phase and register-setup/checking (millicode and component-hardware interactions phases). In other words, the hardware-latency for small blocks of code is relatively short compared to the time spent during setup and checking.
No Parallel Engine Execution:
If a component supports parallel execution of multiple threads in the hardware-engine phases, then multiple store streams for calculated data are required. Note that, in many cases, the likelihood that such parallel execution will be needed is not statistically high enough to justify support for parallel engine execution in hardware. As such, in this embodiment, the component does not support parallel execution of multiple threads in the hardware-engine phases.
Fast-switch-over:
For a significant amount of component utilization patterns, statistically, overall throughput for the component improves through the implementation of input data preparation. In this embodiment, input data preparation includes control register preparation for a second thread while a first thread is executing. Once the first thread finishes with the engine-execution phase, then the component executes an immediate switch over to the second thread.

In some embodiments, the device driver monitors the dynamic reconfiguration kernel services of the OS by registering a handle with the dynamic reconfiguration kernel services, such that the OS invokes the handle in response to a dynamic reconfiguration CPU operation. The device driver also creates a kernel thread, which sleeps until woken by the handle. The handle wakes the kernel thread in response to the OS invoking the handle. In response to waking, the kernel thread determines whether a CPU has been added or removed from the environment. If a CPU has been added, the kernel thread dynamically allocates a queue pair (QP) (i.e., a transmit/receive pair) and returns to sleep. If a CPU has been removed, the kernel thread quiesces the QP of the CPU and/or redirects the queued workload to another CPU, removes the QP, and returns to sleep.

Figure 4:
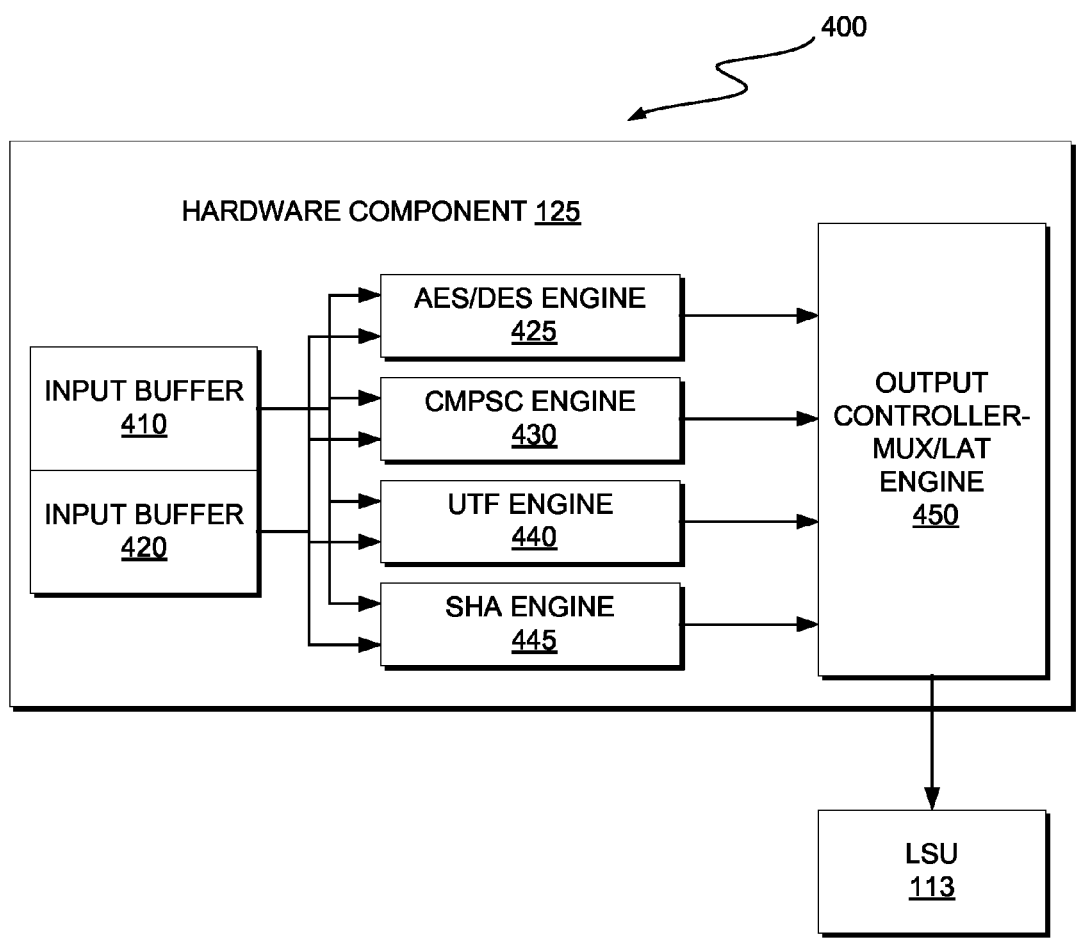
FIG. 4 illustrates a component diagram showing an example of multiple thread processing as implemented by a hardware component of FIG. 1, in accordance with one embodiment of the present invention.

FIG. 4 illustrates a component diagram, 400, showing an example of multiple thread processing as implemented by hardware component 125 of FIG. 1, in accordance with one embodiment of the present invention.

With reference to FIG. 4, the following is an example embodiment and scenario described to provide further understanding of the concepts and implementation details of various embodiments described herein.

As used herein, a "CoP-facility" stands for the component-hardware resources (e.g., two sets of registers and two input buffers). As used in the discussion of FIG. 4, a thread is always in the context of one thread out of four total threads.

The component specific implementation concept of supporting two facilities is supported by the hardware-units of the component, LSU and RU. A set of interface signals exists once per CoP-facility. However, millicode has a thread view (4 threads). The two CoP facilities are presented to millicode on a per thread view. The RU provides a mapping mechanism from CoP-facilities to core-threads.

Based on previously mentioned considerations, as described at least during the discussion of FIG. 3, the component supports multiple thread processing as follows:

a) the component (and LSU-component exclave) provide two sets of control registers (not shown); b) the component provides two sets of status registers (not shown) and two input buffers 410 and 420; c) the component and LSU each support one result data store stream included in output controller-MUX/LAT (multiplex/latch) engine 450 (including output buffer and transfer unit (TU)-load/store (L/S) signals; and d) component hardware-engine utilization is serialized.

As shown in FIG. 4, hardware component 125 includes a number of program processing engines including: AES/DES (advanced encryption standard/data encryption standard) engine 425, CMPSC (compression call instruction) engine 430, UTF (Unicode® engine) engine 440, SHA (secure hash engine) engine 445, and output controller-MUX/LAT engine 450. Hardware component 125 uses these engines to process the program instructions of the threads that are loaded into input buffers 410 and 420.

With reference to elements included in FIG. 4, an example of such a two CoP-facility exploitation is described hereinafter, which is herein used to illustrate a flow of threads using component hardware.

As a setup for this example, assume that there are four threads (A), (B), (C) and (D) in various stages of processing. In this example, the oldest thread (D) utilized the hardware of hardware component 125 in the past. As such, some millicode post-processing remains to be executed in the core outside of the hardware of hardware component 125. The current thread (C) is loaded into input buffer 410 and is in the main hardware-execution phase (e.g. CMPSC-expansion). Therefore, hardware component 125 assigns one set of control registers and status registers to thread (C). Thread (B) has already passed the startup phase as has been loaded into input buffer 420, this includes being setup by millicode using the second set of control registers and status registers. As such, the millicode has filled input buffer 420 to enable a fast switchover by the hardware-engines of the component, once thread (C) finishes with execution. A future thread, (A), is already in the millicode-only phase of preparing/pre-checking using core resources outside of hardware component 125.

With the above-described concept of two CoP-facilities supporting four multithreading (SMT) threads, and the above described setup for this example, the following hardware—millicode interaction are described.

The millicode uses general purpose RU-logic to provide atomic update instructions to perform a CoP-facility selection and a mapping to a thread-identification (thread-ID). The millicode of thread-mapping program 115 ensures that no more than two threads have access to the hardware of the component at a given time. As such, the millicode of thread-mapping program 115 manages a thread-identification-to-CoP-facility mapping program. The millicode ensures that only two of four possible threads have access to the hardware of the component, i.e., only the two threads that have a currently enabled and valid thread-to-facility mapping have access to the hardware of the component.

The thread-ID-to-CoP-facility translation is provided by RU-logic and shadowed via a component bus (CBUS) to LSU 113 and hardware component 125. Layout: two times three bits, per group one valid bit and two bits for thread-ID, first group for CoP-facility A, second group for CoP-facility B. Thread-mapping program 115 writes this mapping to a core register (a central register, not thread specific).

A nibble as used herein refers to a four-bit aggregation, or half an octet. As a nibble contains four bits, there are sixteen possible values, as such a nibble corresponds to a single hexadecimal digit (thus, it is sometimes referred to as a "hex digit" or "hexit"). In one embodiment, two nibbles are used by thread-mapping program 115. For example, in one embodiment, the two nibbles include the following bits: bit 0 is used for CoP-facility A and is currently unused; bit 1 is used for CoP-facility A and is a valid bit since the thread-ID mapping is valid; bits two and three are used for CoP-facility A and indicate the thread-ID; bit 4 is used for CoP-facility B and is currently unused; bit five is used for CoP-facility B and is a valid bit since the thread-ID mapping is valid; bits six and seven are used for CoP-facility B and indicate the thread-ID. Note that, in this embodiment, LSU 113 and hardware component 125 keep shadows of such bits.

The regular registers of hardware component 125 (facility-mapping-registers (MCRs) and regular special purpose registers (RSPRs) for addresses, length, status, . . . ) are "virtualized" such, that they appear to millicode as thread specific, but the hardware (such as RU-logic, hardware component 125 and LSU 113) use the thread-ID to retrieve mapping information to select the correct CoP-facility, i.e., millicode access is a thread specific access. The registers appear, as if they exist four times, all register accesses include two-bit thread-ID (on RU-TU interface and CBUS). Hardware component 125 uses the thread-to-facility translation table to select the correct CoP-facility for the requested thread-ID (same is used in a hardware component 125-exclave in LSU 113). For accesses with a thread-ID not mapped to a CoP-facility, hardware component 125 issues an error checker (pointing out a millicode bug).

Note that the register layout of computing device 110 defines two categories of registers, namely core-regs (C) and thread-regs (T). In reference to the embodiments described in the discussion of at least FIGS. 3 and 4, all registers of hardware component 125 fall into the thread-reg (T) category (with the exception for the single core-reg providing the thread-facility-translation).

In this embodiment, hardware component 125 further includes progress indicators reported to the millicode of thread-mapping program 115 (e.g., indicators for length, counts etc.). Hardware component 125 also includes the functionality to write partial data writes into output buffers; and a "ready pointer" points to the last ready byte to be stored out by LSU. If the ready pointer is pointing into the middle of a data write, then the LSU will not process that data write, unless the last indication has been sent by hardware component 125 to indicate that the ready pointer is now pointing to the last byte of the entire operation being executed by hardware component 125 to process the thread.

In this embodiment, LSU 113 is configured to take a "snapshot" of the ready pointer of the current facility when hardware component 125 indicates "last" byte. Based on such an indication, LSU 113 knows where the facility switch-over is in the output buffer (OB), and also how many bytes of the last data write to store. This also allows hardware component 125 to move the ready pointer forward into the new facility while LSU 113 is still writing back stores from the prior facility. Hardware component 125 indicates ready entries for at most, two facilities. LSU 113 will indicate "done" to hardware component 125 when one facility is completely written back, at which time hardware component 125 starts moving the ready pointer for that facility (provided the prior usage of the same facility had yielded a "last" byte indication). In some embodiments, it is permissible for hardware component 125 to write data into the OB for a third facility while LSU 113 is still storing on a first and then second facility. This is permissible, at least in part, only because LSU 113 does not depend on data writes into the OB. However, LSU 113 does depend, at least in part, on a ready-interface.

Figure 5:
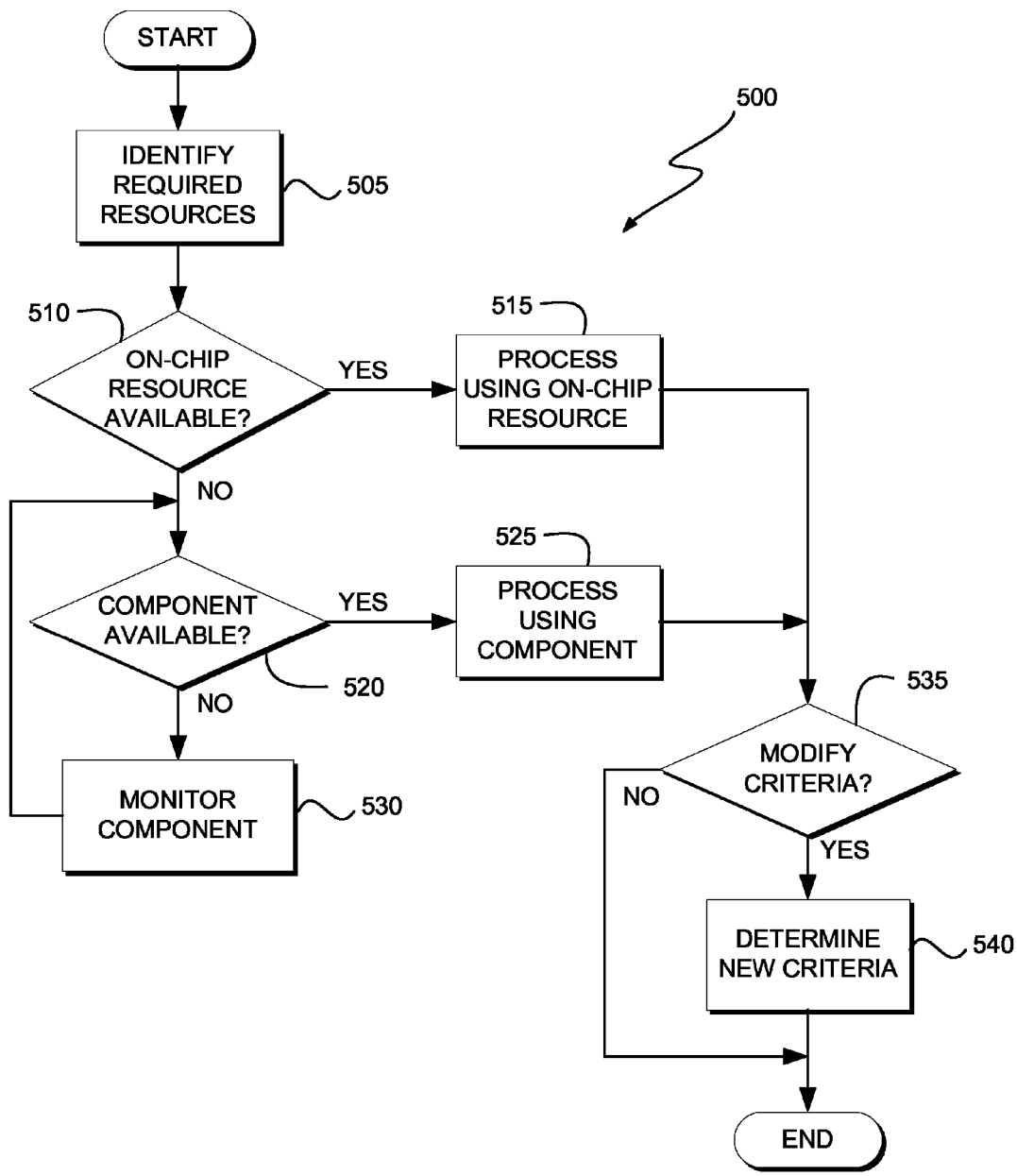
FIG. 5 illustrates a flow diagram of the operational processes of a thread-mapping program, executing on a computing device within the environment of FIG. 1, in accordance with an exemplary embodiment of the present invention.

FIG. 5 illustrates a flow diagram, 500, of the operational processes of thread-mapping program 115, executing on computing device 110 within the environment of FIG. 1, in accordance with an exemplary embodiment of the present invention.

In process 505, thread-mapping program 115 identifies the resources required to process a given thread. Then in decision process 510, thread-mapping program 115 determines whether there is an on-chip resource available that matches the type of resource that is required to process the thread. If there is an on-chip resource available that matches the type of resource that is required to process the thread (decision process 510, YES branch), then thread-mapping program 115 proceeds to process 515. In process 515 thread-mapping program 115 processes the thread using the on-chip resource that was determined to be available and proceeds to decision process 535. In general, the existence of a type of resource is not sufficient in and of itself to determine whether there is an on-chip resource available that matches the type of resource that is required to process the thread. The resource must also be available in sufficient quantity to process the thread. In addition, certain resources are configured to support the processing of a preset number of threads. If the maximum number of threads are already being processed, then thread-mapping program 115 determines that the resource is not available.

If there is not an on-chip resource available that matches the type of resource that is required to process the thread (decision process 510, NO branch), then thread-mapping program 115 proceeds to decision process 520. In decision process 520, thread-mapping program 115 determines whether a component (i.e., a hardware component) is available for the processing of the thread. Such a component includes a resource that matches the type of resource that is required to process the thread. In this embodiment, such a component is determined to be available if the number of threads being processed by the component is less than the maximum number of threads that can be processed by the component. For example, if the component is configured to process a maximum of three threads and is only processing two threads, then thread-mapping program 115 determines that the component is available since the component is capable of supporting the processing of one more thread. If a component is available for the processing of the thread (decision process 520, YES branch), then thread-mapping program 115 proceeds to process 525. In process 525 thread-mapping program 115 processes the thread using the resource of the component that was determined to be available. In general, such a processing follows the processes described in the discussions of FIGS. 1-4 for the processing of a thread using the resources of a component, e.g., a CoP-facility. Thread-mapping program 115 then proceeds to decision process 535.

If thread-mapping program 115 determines that a component is not available for the processing of the thread (decision process 520, NO branch), then thread-mapping program 115 monitors the component for a predetermined period of time (in process 530), e.g., four cycles, after which thread-mapping program 115 returns to decision process 520. In general, such a delay allows the processing of one or more threads by the component to reach a point that allows the component to begin the processing of another thread, i.e., to reach a point at which the component becomes available.

In decision process 535, thread-mapping program 115 determines whether to modify the processing criteria that are applied during the execution of the processes of thread-mapping program 115. If thread-mapping program 115 determines to modify the processing criteria (decision process 535, YES branch), then thread-mapping program 115 proceeds to process 540. In process 540 thread-mapping program 115 determines what the new criteria are and applies them to future execution of the processes of thread-mapping program 115. If thread-mapping program 115 determines not to modify any of the processing criteria (decision process 535, NO branch), then thread-mapping program 115 proceeds to process other threads using the previous criteria.

In general, such a modification to the processing criteria (which include thresholds, periods of time, etc.) increases the efficiency that threads are processed. For example, if the processing of threads is stalling at process 520 due to repeated delays in the processing of other threads, then thread-mapping program 115 determines to modify the processing criteria of process 530 and increases the delay from four cycles to eight cycles. While this does not directly increase the rate at which the threads are processed, the total numbers of commands processed by thread-mapping program 115 are decreased since fewer total processes (determination process 520 and process 530) are being executed. In another embodiment, if thread-mapping program 115 determines that the processing of threads is stalling at process 520, then thread-mapping program 115 returns to determination process 510 after a number of wait cycles have been completed (i.e., after determination process 520 and process 530 have executed the number of times). This allows the processing of the threads to be completed in the case where an on-chip resource becomes available.

Figure 6:
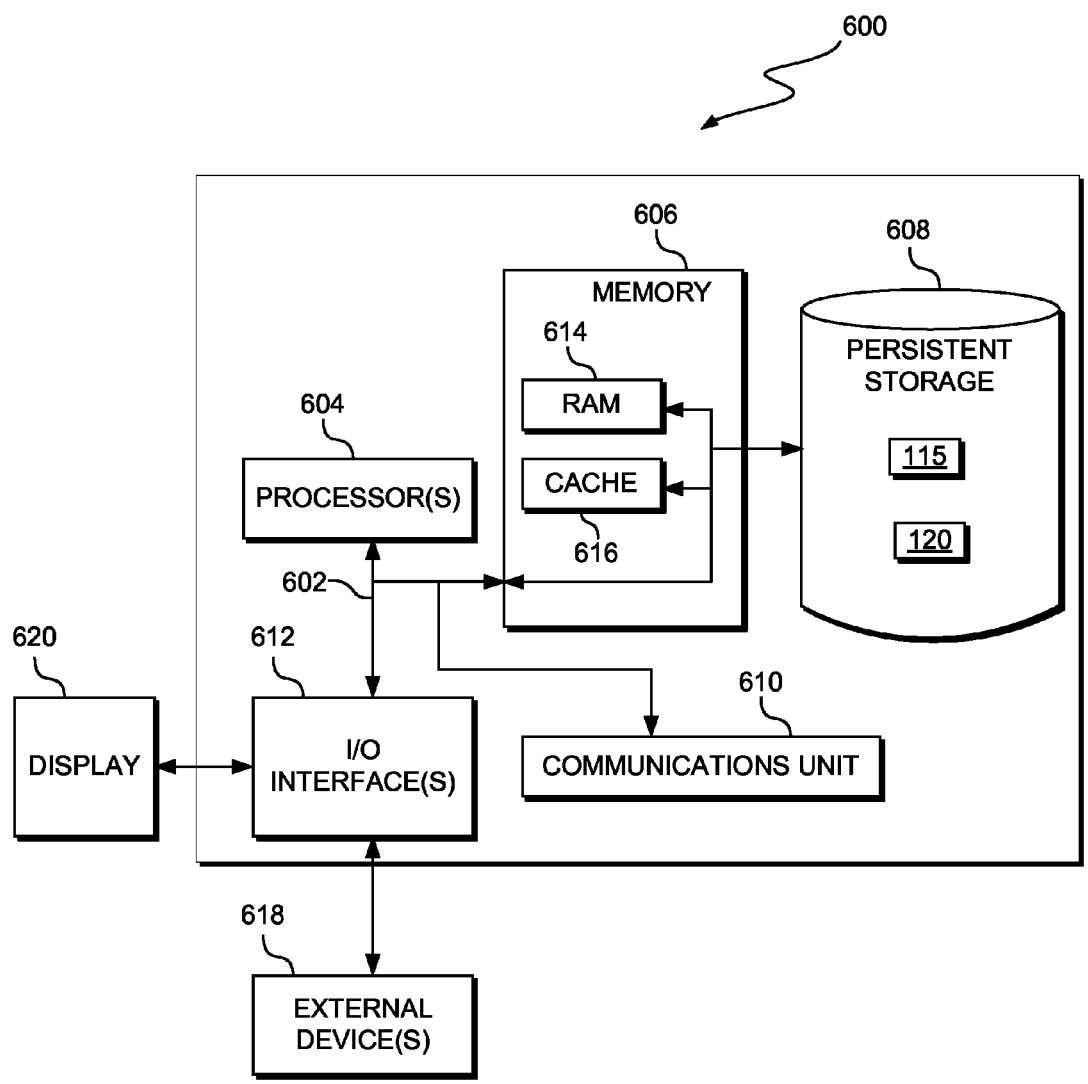
FIG. 6 depicts a block diagram of components of the computing device that is executing the thread-mapping program, in accordance with an exemplary embodiment of the present invention.

FIG. 6 depicts a block diagram, 600, of components of computing device 110 that is executing thread-mapping program 115, in accordance with an exemplary embodiment of the present invention. It should be appreciated that FIG. 6 provides only an illustration of one implementation and does not imply any limitations with regard to the environments in which different embodiments may be implemented. Many modifications to the depicted environment may be made.

Computing device 110 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications, and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Thread-mapping program 115 and resource data 120 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

In some embodiments, the media used by persistent storage 608 is also removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 130. In these examples, communications unit 610 includes one or more network interface cards. Communications unit 610 may provide communications through the use of either or both physical and wireless communications links. In some embodiments, thread-mapping program 115 and resource data 120 are downloaded to persistent storage 608 through communications unit 610.

I/O interface(s) 612 allows for input and output of data with other devices that may be connected to computing device 110. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. In some embodiments, software and data used to practice embodiments of the present invention, e.g., thread-mapping program 115 and resource data 120, are stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method of a processor supporting multiple execution of threads in parallel, the method comprising:

determining, by a processor, that processing of a first thread of a plurality of threads is suspended due to limited availability of a first processing resource, wherein the processor supports execution of the plurality of threads in parallel;

obtaining, by the processor, a first lock on a second processing resource that is a substitutable substitute for the first processing resource during processing of the first thread, wherein the second processing resource is included as part of a component that is external to the processor, wherein the component supports a number of threads that is less than the plurality of threads, and wherein the processing of the first thread is suspended until the first lock is available;

processing, by the processor, the first thread using the second processing resource, wherein the processor includes a shared register to support mapping of a portion of the plurality of threads to the component, and wherein that portion of the plurality of threads is equal to, at most, the number of threads that are supported by component:

determining, by the processor, whether the first thread has been processed; and responsive to a determination that the first thread has been processed, releasing, by the processor, the first lock on the second processing resource.

2. The method of claim 1, the method further comprising:

determining, by the processor, that processing of a second thread of the plurality of threads is suspended due to limited availability of the first processing resource;

determining, by the processor, whether the first lock on the second processing resource has been released; and responsive to a determination that the first lock on the second processing resource has been released, obtaining, by the processor, a second lock on the second processing resource such that the second thread is processed using the second processing resource.

3. The method of claim 1, wherein the second processing resource is included as part of a component that operates in parallel with the processor.

4. The method of claim 3, wherein the second resource is statistically unlikely to be needed for the processing of more than the number of threads that are supported by the component.

5. The method of claim 1, wherein the second processing resource is a hardware resource.

6. The method of claim 1, wherein the component is a coprocessor that is configured to process one or more of: mathematical calculations, input operations, output operations, and graphics operations.

* * * * *